Sept. 19, 1944.  J. F. HURLEY  2,358,575
HOSE CLAMP
Filed Oct. 29, 1943
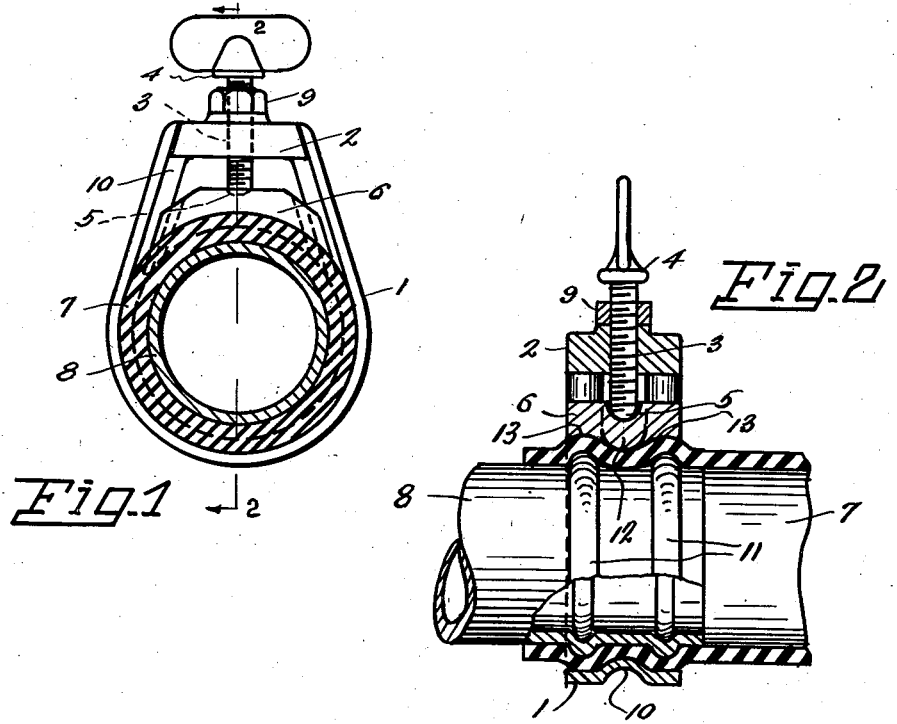
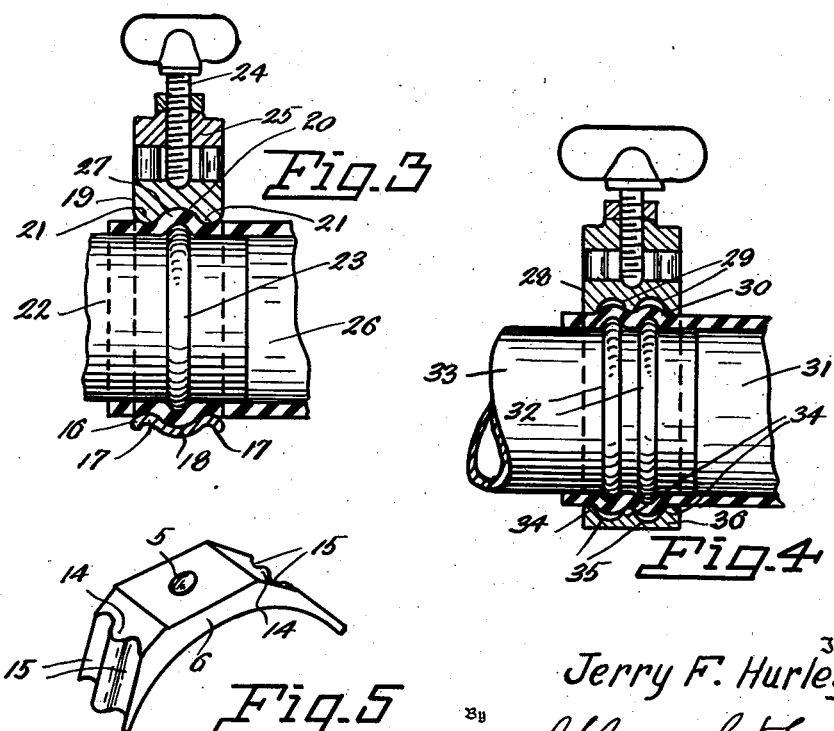
Inventor
Jerry F. Hurley
By Glenn L. Fish
Attorney Patented Sept. 19, 1944

2,358,575

UNITED STATES PATENT OFFICE 2,358,575

HOSE CLAMP

Jerry F. Hurley, Spokane, Wash.

Application October 29, 1943, Serial No. 508,122

4 Claims. (Cl. 24—19)

This invention relates to hose clamps and it is one object of the invention to provide a clamp which is particularly adapted for securing a hose about a tube constituting an element of an air craft and so bind the hose about the tube that it cannot work loose when subjected to vibrations or to sudden shocks incident to landing the aircraft or running along a landing field.

Another object of the invention is to provide a clamp including a band for encircling the hose and a pressure block, the band and the block being formed with ribs and grooves for cooperating with companion ribs about the tube and crimping the hose so that it will be firmly bound in place.

Another object of the invention is to so form ends of the block that they will have interfitting engagement with the band and thus prevent the block from turning out of its proper position when the pressure applying screw is tightened.

Another object of the invention is to provide a clamp which is simple in construction, easy to apply, and of such formation that when it is applied and its set screw tightened, it will not be liable to work loose.

The invention is illustrated in the accompanying drawing, in which:

Fig. 1 is a view showing the improved clamp in end elevation and disposed about a hose for securing the hose to a tube.

Fig. 2 is a sectional view on the line 2—2 of Fig. 1.

Fig. 3 is a view similar to Fig. 2, of a modified form of clamp.

Fig. 4 is a sectional view of another modified form of clamp.

Fig. 5 is a perspective view of the pressure block.

The clamp illustrated in Figs. 1 and 2 of the drawing has a band or strap 1 formed from a strip of strong metal and having its ends welded to ends of a cross head 2 formed of hard metal and having a threaded opening 3 midway the length thereof. A set screw 4 is threaded through the opening 3 with its inner end fitting into a depression or socket 5 formed in a block 6 to force the block into tight binding engagement with a hose 7 about which the clamp fits and bind the hose tightly about a tube 8, a locking nut 9 being provided upon the screw for engaging the cross head and preventing loosening of the screw.

Referring to Figs. 2 and 5, it will be seen that the band or strap 1 is crimped to form a rib 10 of concavo convex formation for fitting between circumferentially extending ribs 11 of the tube 8, the under face of the block being formed with a longitudinally extending rib 12 located midway its width and disposed between grooves 13, and ends of the block being formed with ribs 14 and grooves 15.

When the clamp is applied, it fits about the hose with the ribs 10 and 12 disposed between the ribs 11 of the tube and as the screw 4 is tightened to force the block inwardly and shift the cross head outwardly, the hose will be crimped and portions forced into the grooves 13 and close against the band at opposite sides of the rib 10. It will thus be seen that the crimped portions of the hose will fit closely about and between the ribs 11 and likelihood of the hose slipping from the tube 8 will be eliminated. Since ends of the block are formed with the ribs 14 and grooves 15, interfitting engagement will be established between the block and side portions of the band and the block will be prevented from turning with the screw as the screw is tightened. Therefore, the block will be maintained in a position circumferentially of the hose and the hose will be crimped for its entire circumference. It will thus be impossible for the hose to accidentally slip out of engagement with the tube. When, however, it is desired to detach the hose from the tube, it is merely necessary to loosen the screw 4 and the clamp may then be shifted out of place about the ribs 11 and the hose drawn off the tube.

In Figure 3, there has been illustrated a clamp of slightly modified formation. In this form of clamp, the band 16 is formed with spaced ribs 17 defining a groove 18 between them and the block 19 is formed with a groove 20 disposed midway the width of the block between ribs 21. The tube 22 has a single circumferentially extending rib 23 and, when the screw 24 carried by the cross head 25 is tightened, the hose 26 will be formed with a single rib 27 instead of a plurality of ribs.

In Figure 4 the block 28 is formed in its under face with transversely spaced grooves 29 and circumferentially extending ribs 30 which taper transversely so that they will have biting engagement with the hose 31 and crimp the hose very firmly about the circumferentially extending ribs 32 of the tube 33. It is also to be noted that in this embodiment of the invention, the ribs and grooves of the band 28 are formed by cutting the under face of the block and also the corresponding ribs 34 and grooves 35 of the band 36 are similarly formed and the ribs of the band and the block have very tight gripping engagement with the hose.

Having thus described the invention, what is claimed is:

1. A hose clamp comprising a cross head formed with a threaded bore, a band for engaging about a hose, said band having its ends secured to ends of the cross head, a screw threaded through the bore of said cross head, and a pressure block under said cross head formed with a socket receiving the inner end of the set screw, inner faces of the block and the band being formed with longitudinally extending ribs and grooves for crimping portions of a hose about circumferentially extending ribs of a tube and firmly securing the hose about the tube, and ends of the block being formed externally with longitudinally extending ribs and grooves for interfitting engagement with the ribs and the grooves of the band to prevent transverse movement of the block out of operative position under the cross head.

2. A hose clamp comprising a cross head, a band for extending about a hose having ends secured against ends of the cross head, a set screw threaded through the cross head, a block under said cross head disposed between ends of the band and engaged by the inner end of said set screw, ends of the block being formed with transversely spaced ribs, and said band being formed with longitudinally extending ribs interfitting with the ribs of the block to prevent transverse movement of the block when the screw is tightened.

3. In combination with a tube adapted to fit into a hose and formed with circumferentially extending ribs; a clamp for fitting about the tube and a portion of a hose into which the tube fits, said clamp comprising a cross head, a hose-encircling band having its ends fixed to ends of the cross head, a block under the cross head, and a set screw threaded through the cross head and engaging said block, the band and the block being formed with ribs and grooves cooperating with the ribs of the tube to crimp the hose and firmly hold the hose in place about the tube.

4. A hose clamp comprising a cross head, a hose-encircling band having ends fixed to ends of the cross head, a block under said cross head extending between end portions of the band, and a set screw passing through the cross head with its inner end bearing against the block for tightening the clamp about a hose, ends of the block and confronting portions of the band having interfitting ribs and grooves to prevent transverse movement of the cross head out of operative position under the block when the screw is tightened.

JERRY F. HURLEY.